United States Patent [19]
Nakada

[11] Patent Number: 5,961,578
[45] Date of Patent: Oct. 5, 1999

[54] DATA PROCESSOR AND MICROCOMPUTER

[75] Inventor: Kunihiko Nakada, Koganei, Japan

[73] Assignee: Hitachi, Ltd., Tokyo, Japan

[21] Appl. No.: 08/883,235

[22] Filed: Jun. 26, 1997

[30] Foreign Application Priority Data

Jun. 28, 1996 [JP] Japan .................................. 8-169322

[51] Int. Cl.$^6$ ...................................................... G06F 7/38
[52] U.S. Cl. ............................................................ 708/491
[58] Field of Search ............................... 364/746; 371/54; 380/28

[56] References Cited

U.S. PATENT DOCUMENTS 5,414,651 5/1995 Kessels ..................................... 364/746
5,724,279 3/1998 Benaloh et al. ......................... 364/746

OTHER PUBLICATIONS

Mathematics of Computation, vol. 44, No. 170, Apr. 1985, "Modular Multiplication Without Trial Division", P. Montgomery, pp. 519–521.

Advances in Cryptology, "A Cryptographic Library for the Motorola DSP56000", Dusse et al, pp. 230–237, undated.

"Modern Cryptography Theory", by Ikeno and Koyama, edited by the Institute of Electronics, Information and Communication Engineers of Japan (1986).

*Primary Examiner*—Tan V. Mai
*Attorney, Agent, or Firm*—Fay, Sharpe, Beall, Fagan, Minnich & McKee

[57] ABSTRACT

In a microcomputer incorporating a microprocessor, the coprocessor having product-sum operation arithmetic units executes residue multiplications given by "$A=A \cdot B \cdot R^{-1}$ mod $N+kN$", "$A=A^2 \cdot R^{-1}$ mod $N+kN$" and "$A=A \cdot R^{-1}$ mod N 30 kN" and is provided with a multiplication function of executing a preprocessing "$R^2$ mod $N$" at high speed. It is possible to perform a power-residue operation "$X^Y$ mod $N$" at high speed by the microprocessor, using these calculation functions of the coprocessor.

15 Claims, 11 Drawing Sheets

CONCEPT OF $R^2 \bmod N$ CALCULATION

DATA PROCESSOR AND MICROCOMPUTER

BACKGROUND OF THE INVENTION

The present invention relates to a technology suitably applied to data processors having a residue calculation function and more particularly to a technology suitably applied to encoders and decoders using residue multiplication and power-residue calculations.

Cryptography technology includes public-key cryptography. For example, as shown in FIG. 14, a sender encodes a message M according to "$C=M^e$ mod N" to make a cryptogram C, and the receiver decodes the cryptogram C according to "$M=C^d$ mod N" to obtain the message M. In the above encoding, the parameters e and N are made public. In the decoding, d is kept secret. The operation expressions used for the encoding and decoding are for power-residue operations, and representatively "$X^Y$ mod N" (where X, Y and N are positive integers). "mod" means a residue operation and the power-residue operation "$X^Y$ mod N" has a solution which is the remainder of the division of $X^Y$ by N.

It is generally known that the encoder/decoder can offer a high degree of security by using a power-residue operation "$X^Y$ mod N" (where X, Y and N are positive integers). A description of this fact is found in the "Modern Cryptography Theory" by Ikeno and Koyama, edited by the Institute of Electronics, Information and Communication Engineers of Japan (1986).

Because X, Y and N are very large numbers ranging from 100 to 2,000 bits, it has been a problem in the mathematics and engineering fields how to calculate "$X^Y$ mod N" at high speed.

As one of the solutions of this problem, [algorithm 1] shown below is a classically known.

[Algorithm 1]

| | |
|---|---|
| input X, Y = $e_n e_{n-1} \ldots e_1$, N | Step 1 |
| A = X | Step 2 |
| B = X | Step 3 |
| for i = n−1 to 1 step −1 { | Step 4 |
|     A = $A^2$ mod N | Step 5 |
|     if $e_i$ = 1 then A = A·B mod N | Step 6 |
| } | Step 7 |
| output A | Step 8 |

In this algorithm, n corresponds to the number of bits Y, and $e_n e_{n-1} \ldots e_1$ is a binary representation of Y. This algorithm, roughly speaking, is executed by combining a square-residue multiplication "$A^2$ mod N" (step 5) and a residue multiplication "A·B mod N" (step 6). Letting the number of logical value 1 in $e_n e_{n-1} \ldots e_1$ be represented by r(e), the square-residue multiplication "$A^2$ mod N" is repetitively performed n−1 times and the residue multiplication "A·B mod N" is repeated r(e)−1 times.

Because in the [Algorithm 1] the power-residue operation "$X^Y$ mod N" is resolved into the residue multiplication "A·B mod N" and so forth, an arithmetic unit capable of realizing the calculation function of "A·B mod N" is obtained.

There is a problem, however, that because A and B are both large numbers having their data lengths of, for example, 512 bits, the interim result AB becomes a large 1024-bit number. Further, because the final result is the remainder of the division of A·B by N, the division 1024-bit number÷a 512-bit number, involving very large values, must be performed. Although the multiplication can be parallelly executed at high speed using a microprocessor by dividing the multiplier and the multiplicand, division is difficult to be parallelly processed at high speed. Even if the calculation is resolved into the residue multiplication operations "A·B mod N" for execution, the division in these residue multiplication calculations still prevents higher speed processing.

For solving the problem of division in the above residue multiplication "A·B mod N" in particular, the following [Algorithm 2] is known which does not perform the division by N in executing the residue multiplication "A·B·$R^{-1}$ mod N", where R is $2^n$ (n is the size of N for example) and a positive integer satisfying R>N.

The proof leading to the [Algorithm 2] that executes the residue multiplication "A·B·$R^{-1}$ mod N" without performing division by N will not be described in detail. But there is a description in, for example, Montgomery, P. L.: Modular Multiplication without Trial Division, Mathematics of Computation, Vol. 44, No. 170, pp. 519–521 (1985), Dussé, S. R. and Kaliski, B. S. Jr.: A Cryptographic Library for the Motorola DSP56000, Advances in Cryptology-EUROCRYPTO'90, Lecture Notes in Computer Science 473, pp. 230–244, Springer-Verlag (1991).

[Algorithm 2]

| | |
|---|---|
| $N'=-N^{-1}$ mod R | Step 1 |
| $M=A·B·N'$ mod R | Step 2 |
| $t=(A·B+M·N)/R$ | Step 3 |
| if $t \geq N$ then return $t−N$ else return $t$ | Step 4 |

SUMMARY OF THE INVENTION

The inventor has found that these algorithms have the following problems.

First Problem

In the [Algorithm 2], preprocessing needs to be done at step 1 and step 2 to calculate N' and M in advance. A memory device for storing the value of M temporarily is also required.

Second Problem

In the [Algorithm 2], it is necessary at step 4 to compare t and N, which requires actual subtraction of large values of t and N. Performing such subtraction repetitively increases the overall calculation time.

Third Problem

At step 3 of the [Algorithm 2], the interim result A·B is a large number with a data length equal to the sum of the data lengths of A and B, so an additional memory device for temporarily storing these values is required. Further, although the [Algorithm 2] no longer requires division by N, which is required in the [Algorithm 1], it is necessary at the step 3 to perform multiplications of large numbers of A, B, M and N. We have found that how to efficiently realize the calculation is the problem that needs to be solved. When this is intended to be realized with hardware, data exchange must be carried out frequently between the memory device holding the values of A, B and N and the arithmetic unit that performs multiplications. We have found that this means that logic circuits of memory device and data paths must be minimized in size.

Fourth Problem

Another problem is how to efficiently perform the power-residue calculation "$X^Y$ mod N" by using the residue multiplication "A·B·$R^{-1}$ mod N" calculated by the [Algorithm 2]. As an example, the inventor applied the [Algorithm 2] to modify the [Algorithm 1] and obtained the following [Algorithm 3].

[Algorithm 3]

| | |
|---|---|
| input X, y = $e_n e_{n-1} \ldots e_1$, N, R | Step 1 |
| B = $R^2$ mod N | Step 2 |
| A = X | Step 3 |
| A = A·B·$R^{-1}$ mod N | Step 4 |
| B = A | Step 5 |
| for i = n−1 to 1 step −1 { | Step 6 |
|    A = $A^2$·$R^{-1}$ mod N | Step 7 |
|    if $e_i$ = 1 then A = A·B·$R^{-1}$ mod N | Step 8 |
| } | Step 9 |
| A = A·$R^{-1}$ mod N | Step 10 |
| .output A | Step 11 |

This [Algorithm 3]requires preprocessing at step 2 of calculation "$R^2$ mod N" at step 2. When this calculation is done by software using a general-purpose microprocessor, the calculation takes a long time. We have found that this preprocessing increases the overall calculation time of the [Algorithm 3]. This problem also occurs at step 5 and 6 in the [Algorithm 1].

Fifth Problem 5

In calculating "$A^2 \cdot R^{-1}$ mod N" in the [Algorithm 3] at step 7 by using the residue multiplication "A·B·$R^{-1}$ mod N", we have found that transferring the value A to B takes a long time. In the step 10 of the [Algorithm 3], the value of B must be set to B=1, increasing the calculation time.

Sixth Problem 6

Further, in [Algorithm 3] "A=A·B·$R^{-1}$ mod N" at the step 4, "A=$A^2$·$R^{-1}$ mod N" at step 7 and "A=A·B·$R^{-1}$ mod N" at step 8 require the calculation result to be stored in the same memory device A in which the input value is stored. Because the calculation of residue multiplication "A·B·$R^{-1}$ mod N" generally cannot be executed instantaneously and takes a number of clocks for referencing the input values A, B and N a number of times. Hence, the interim results and the final result cannot be stored in the same memory device in which the input value A is held and therefore need to be stored as temporary values (Temp) in a separate memory device (for example, a temporary register). Thus, the operation expression in practice becomes "Temp←A·B·$R^{-1}$ mod N". This means that the step 8 requires the execution "A←Temp" last, increasing the calculation time. This problem also occurs in step 5 and step 6 of the [Algorithm 1].

The present invention has been accomplished under these circumstances and its objective is to realize fast execution of the power-residue calculation "$X^Y$ mod N".

Especially, it is an object of this invention to solve the above problems by using dedicated hardware and a general-purpose microprocessor and thereby to realize a fast power-residue calculation "$X^Y$ mod N".

Another object of this invention is to minimize the size of logic circuit used in the dedicated hardware.

Still another object of this invention is to realize a microcomputer for encoding and decoding at low cost and with ease of use, which has the dedicated hardware mounted on the same semiconductor chip where the IC card microcomputer is provided and which applies a power-residue calculation "$X^Y$ mod N".

These and other objects and novel features of this invention will become apparent from the description of this specification and the accompanying drawings.

Representative aspects of this invention disclosed in this application will be summarized as follows.

A data processor (6) used for the power-residue operation comprises a calculation means (32) for performing a residue operation and a control means (31) for controlling the residue operation performed by this calculation means, both formed on a single semiconductor substrate. The calculation means (32) performs a residue operation given by an operation expression "$A_{out}$=f($A_{in}$) mod N+kN", where the input value $A_{in}$ and output value $A_{out}$ are integers equal to or greater than 0 and less than $2^n$, n is a positive integer representing the number of bits of an operand, N an n-bit positive integer in the range of 0<N<$2^n$, $A_{in}$ an n-bit positive integer in the range of 0≦$A_{in}$<$2^n$, $A_{out}$ an n-bit positive integer in the range of 0≦$A_{out}$<$2^n$, and K is 0 or a positive integer.

The residue operation given by the above general expression $A_{out}$=f($A_{in}$) mod N+kN can be rewritten into operation expressions "$A_{out}$=$A_{in}$·B·$R^{-1}$ mod N+kN" and "$A_{out}$=$A_{in}$·B mod N+kN" where R is $2^n$, $R^{-1}$ an n-bit positive integer in the range of 0<$R^{-1}$≦N that satisfies "R·$R^{-1}$ mod N=1," and B an n-bit positive integer in the range of 0≦B<2n.

The residue operation given by the above operation expression "$A_{out}$=$A_{in}$·B·$R^{-1}$ mod N+kN" may include a calculation t=($A_{in}$·B+M·N)/R followed by a calculation given by "if t≧R then return t−N else return t" where t−N or t is $A_{out}$. A typically illustrated in FIG. 1, in the comparison between t and R t≧R is detected based on the overflow of n bits of t. The t−N calculation need only be performed depending on the result of the overflow detection and this method reduces the number of subtractions "t−N" compared with a method that directly compares t and N, thus contributing to increasing the residue operation speed.

As sown in FIG. 11 and 12, the data processor has serially connected product-sum operation arithmetic units (33, 34) and can execute the operation t=($A_{in}$·B+M·N)/R to obtain a partial product sum. Thus, it does not require a temporary memory means for storing the partial product, realizing a reduction in the size of the circuit of the calculation means.

The control means can use the series-connected product-sum operation arithmetic unit to selectively execute a multiple-precision multiplication whose multiplier and multiplicand have multiple lengths.

This can be applied to the multiple-precision multiplication required in the "$R^2$ mod N" processing in power-residue calculation.

The calculation means, as shown in FIG. 5, may include means (16, 17) that selectively specify the value of B in the operation expression "$A_{out}$=$A_{in}$·B·$R^{-1}$ mod N+kN" to be either $A_{in}$ or 1. This allows "$A_{in}$·B·$R^{-1}$ mod N+kN", "$A_{in}^2$·$R^{-1}$ mod N+kN" and "$A_{in}$·$R^{-1}$ mod N+kN" to be calculated similarly, eliminating the need to transfer the value A to the value-B holding register or to set 1 in the value-B holding register, thus contributing to increasing the residue calculation speed.

The microcomputer(MCU), as shown in FIG. 3, includes the data processor (6) and a microprocessor (5) that uses the data processor as a coprocessor, both formed in a single semiconductor substrate. The microprocessor sets an input value in the data processor for the calculation "$A_{out}$=$A_{in}$·B·$R^{-1}$ mod N+kN", orders the execution of the calculation, and uses the results of the calculation. With this microcomputer, the calculation given by the residue multiplications "$A_{out}$=$A_{in}$·B·$R^{-1}$ mod N+kN", "$A_{out}$=$A_{in}^2$·$R^{-1}$ mod N+kN" and "$A_{out}$=$A_{in}$·$R^{-1}$ mod N+kN" is performed by the coprocessor that incorporates a product-sum operation arithmetic units. The coprocessor has a multiplication function of executing the preprocessing "$R^2$ mod N" at high speed. Using these coprocessor's calculation functions, the microprocessor executes a power-residue operation "$X^Y$ mod N" at high speed.

A ROM (8) containing a program for causing the microprocessor to execute power-residue operation can be mounted on a microcomputer chip. In this case, the operation "$A_{out}=A_{in} \cdot B \cdot R^{-1}$ mod N+kN" is included in the power-residue operation. This configuration can realize a microcomputer operation. This configuration can realize a microcomputer that contributes to achieving a high degree of security.

It is also possible to mount on the microcomputer chip a nonvolatile memory (10) that holds data for the power-residue operation electrically programmably. This allows the microcomputer to be optimized as the IC card microcomputer that handles data requiring high level of security.

The data processor that executes a calculation defined by an operation expression "$A_{out}=f(A_{in})$" with a result $A_{out}$ of calculation used as the input value $A_{in}$ of the next calculation can comprise, as shown in FIG. 7, memory means (23, 24) that store the contents of $A_{in}$ and $A_{out}$, a flag means (27) that specifies exchange of the storage locations of $A_{in}$ and $A_{out}$ in the memory means, and control means (28, 31) which, after the operation according to the expression has been calculated, invert the value of the flag means to logically exchange the storage locations of $A_{in}$ and $A_{out}$ instead of physically exchanging the values of $A_{in}$ and $A_{out}$. This allows the exchange of storage locations of the values $A_{in}$ and $A_{out}$ to be performed apparently instantly, thus contributing to a reduction in the calculation time.

The processing using the serially connected product-sum operation arithmetic units can also be applied to the data processor described blow. This data processor comprises a calculation means and a control means, both formed in a single semiconductor substrate, wherein the calculation means performs a residue operation defined by an operation expression "$A_{out}=f(A_{in})$ mod N", where the input value $A_{in}$ and output value $A_{out}$ are integers equal to or greater than 0 and less than $2^n$, n is a positive integer representing the number of bits of an operand, N an n-bit positive integer in the range of $0<N<2^n$, $A_{in}$ an n-bit positive integer in the range of $0 \leq A_{in}<2^n$ and $A_{out}$ an n-bit positive integer in the range of $0 \leq A_{out}<2^n$, and the control means controls the residue operation performed by the calculation means. The residue operation defined by the operation expression "$A_{out}=f(A_{in})$ mod N" includes a residue operation given by an operation expression "$A_{out}=A_{in} \cdot B \cdot R^{-1}$ mod N" where R is $2^n$, $R^{-1}$ an n-bit positive integer in the range of $0<R^{-1} \leq N$ that satisfies "$R \cdot R^{-1}$ mod N=1", and B an n-bit positive integer in the range of $0<B \leq 2^n$. The calculation means has serially connected product-sum operation arithmetic units to execute residue operation defined by an operation expression "$A_{out}=A_{in} \cdot B \cdot R^{-1}$ mod N". An example of residue calculation given by an operation expression "$A_{out}=A_{in} \cdot B \cdot R^{-1}$ mod N" performed by this calculation means includes a calculation defined by "$t=(A_{in} \cdot B+M \cdot N)/R$" followed by a calculation of "if $t \geq R$ then return t−N else return t", in which t−N or t is $A_{out}$. The calculation means executes the calculation "$t=(A_{in} \cdot B+M \cdot N)/R$" as the sum of partial products by the serially connected product-sum operation arithmetic units. This scheme, too, does not require a temporary storage memory for the partial products and can reduce the size of the circuit of the calculation means.

DETAILED DESCRIPTION OF THE PREFERRED EMBODIMENTS (1) First Embodiment

The above [Algorithm 2] requires comparison between t and N to be performed at step 4 in each cycle. Particularly when the values of t and N are large, the subtraction t−N that must actually be performed gives rise to the above-mentioned second problem of the increased overall calculation time. To solve this problem, the first embodiment performs comparison between t and R, rather than t and N, at step 4 in the [Algorithm 2]. The new algorithm is shown below.

[Algorithm 4]

| | |
|---|---|
| $N'=-N^{-1}$ mod R | Step 1 |
| $M=A \cdot B \cdot N'$ mod R | Step 2 |
| $t=(A \cdot B+M \cdot N)/R$ | Step 3 |
| if $t \geq R$ then return t−N else return t | Step 4 |

In the above [Algorithm 4] the number of bits of A, B and N are n bits and $R=2^n$ (binary number which has a logical value 0 for all bits up to n-th bit and a logical value 1 for (n+1)th bit). This Algorithm 4 realizes an operation expression "$A_{out}=A \cdot B \cdot R^{-1}$ mod N+kN" described later and its processing can be regarded as a subroutine for a power-residue operation. In the Algorithm 4, if $t \geq R$, t−N is taken as $A_{out}$; and if t<R, t is taken as $A_{out}$.

The comparison and subtraction at step 4 in the above [Algorithm 4] can be characterized as an "overflow correction", which checks the overflow of t to determine whether the result of calculation of "$t=(A \cdot B+M \cdot N)/R$" is equal to or greater than a predetermined value $2^n$ (=R) and, when the overflow is detected, corrects t to t−N at step 3. One example of a circuit that realizes this characteristic is the overflow correction circuit shown in FIG. 1. FIG. 2 shows a block diagram of an overflow correction circuit for comparison, which realizes the step 4 of the [Algorithm 2].

First, in FIG. 2, the subtraction t−N is executed by a subtracter 3A. Depending on whether a borrow has occurred or not as a result of the subtraction, either t or the result of subtraction t−N is selected by a selector 4A and outputted. In this configuration, therefore, the subtraction t−N needs to be always executed.

Figure 1:
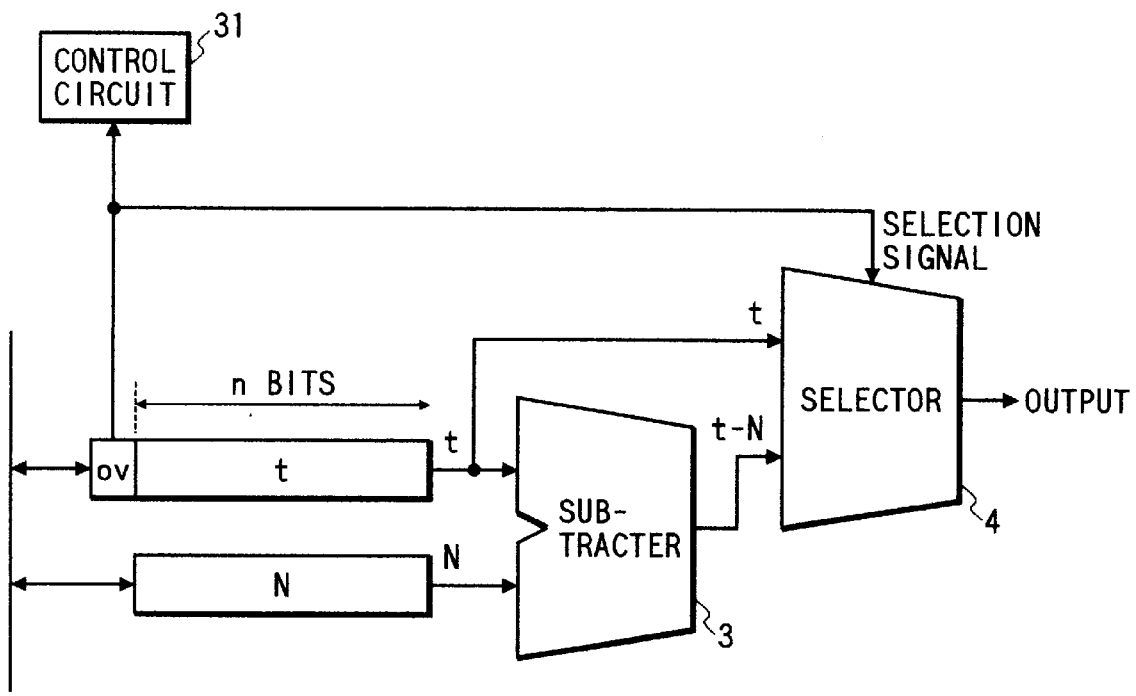
FIG. 1 is a block diagram showing an example of an overflow correction circuit.
Figure 2:
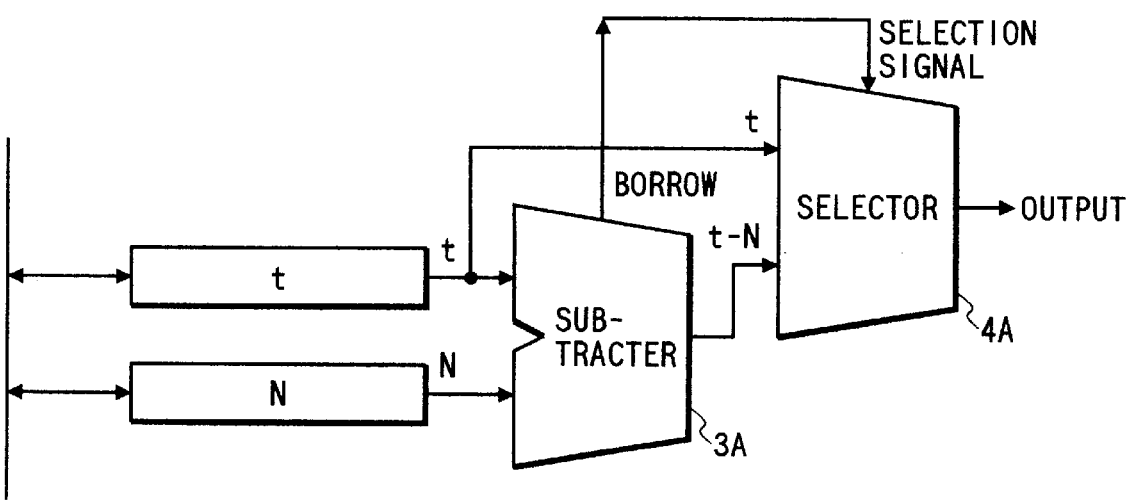
FIG. 2 is a block diagram showing an example of an overflow correction circuit, for comparison with the one of FIG. 1.

On the contrary, the configuration of FIG. 1 checks if the overflow bit OV is 0 or 1 to decide whether the value of t exceeds the predetermined number n of bits. This corresponds to the above-mentioned comparison between t and R. That is, because $R=2^n$, when the overflow bit OV is 1, $t \geq R$; when the overflow bit OV is 0, t<R.

Hence, only when OV=1, i.e., the overflow is occurring, the subtraction t−N is performed by a subtracter 3, and the result of the subtraction is selected by a selector 4 and outputted. When OV=0, i.e., the overflow is not occurring, the subtraction by the subtracter 3 is not performed, and t is selected as it is by the selector 4 and outputted. The overflow bit OV is also supplied to a control circuit 31 that controls calculation. The control circuit 31 determines, for example, whether or not the subtraction should be executed by the subtracter 3, depending on whether OV=1 or OV=0. When the subtraction is done, the control circuit 31 performs control to latch the output of the selector 4 in a subsequent stage after the subtraction is completed.

Thus, the configuration of FIG. 1 can reduce the frequency of the subtraction, compared with the configuration of FIG. 2, thereby shortening the average calculation time.

The final calculation result t of the [Algorithm 4] may become larger than N. That is, because R ($=2^n$)>N, if the value of t obtained as a result of the step 3 and the overflow correction is smaller than R and greater than N, the value of t is taken as the calculation result given by the [Algorithm 4]. In the case of the [Algorithm 2], because it is compared directly with N, the final calculation result t is always smaller than N. Hence, it is necessary to express the entire [Algorithm 4] as "$A \cdot B \cdot R^{-1}$ mod N+kN" to eliminate the error by the correction term kN, where K is 0 or a positive integer.

The above residue operation expression "$A \cdot B \cdot R^{-1}$ mod N+kN" can be rewritten as "$A_{out} = A_{in} \cdot B, R^{-1}$ mod N+kN" if the value A is distinguished between its input value ($A_{in}$) and output value ($A_{out}$). This is generalized as "$A_{out} = f(A_{in})$ mod N+kN", and the input value $A_{in}$ and output value $A_{out}$ greater than N and less than $2^n$, where n is a positive integer representing the number of bits of the operand, N an n-bit positive integer in the range of $0 < N < 2^n$, $A_{in}$ is an n-bit positive integer in the range of $0 \leq A_{in} < 2^n$, $A_{out}$ is an n-bit positive integer in the range of $0 \leq A_{out} < 2^n$, and k is 0 or a positive integer. R is $2^n$, $R^{-1}$ an n-bit positive integer in the range of $0 < R^{-1} \leq N$ that satisfies "$R \cdot R^{-1}$ mod N=1", and B an n-bit positive integer in the range of $0 \leq B < 2^n$.

When the [Algorithm 4] is used, correcting the [Algorithm 3] which executes the power-residue operation "$X^Y$ mod N", according to the correction term of the [Algorithm 4] results in an [Algorithm 5] as shown below.

[Algorithm 5]

| | |
|---|---|
| input X, Y = $e_n e_{n-1} \ldots e_1$, N, R | Step 1 |
| B = $R^2$ mod N | Step 2 |
| A = X | Step 3 |
| A = $A \cdot B \cdot R^{-1}$ mod N + kN | Step 4 |
| B = A | Step 5 |
| for I = n−1 to 1 step −1 { | Step 6 |
| $\quad$ A = $A^2 \cdot R^{-1}$ mod N + kN | Step 7 |
| $\quad$ if $e_i$=1 then A = $A \cdot B \cdot R^{-1}$ mod N + kN | Step 8 |
| } | Step 9 |
| A = $A \cdot R^{-1}$ mod N + kN | Step 10 |
| A = A mod N | Step 11 |
| output A | Step 12 |

The changes made in the [Algorithm 3] to obtain the [Algorithm 5] include only changing the operation expressions of the residue multiplications at step 4, 7, 8 and 10 and adding the step 11. The step 11 is added to make the calculation result smaller than N. The calculation of the [Algorithm 5] can be executed by a general-purpose microprocessor. This embodiment uses a coprocessor as a dedicated hardware.

Figure 3:
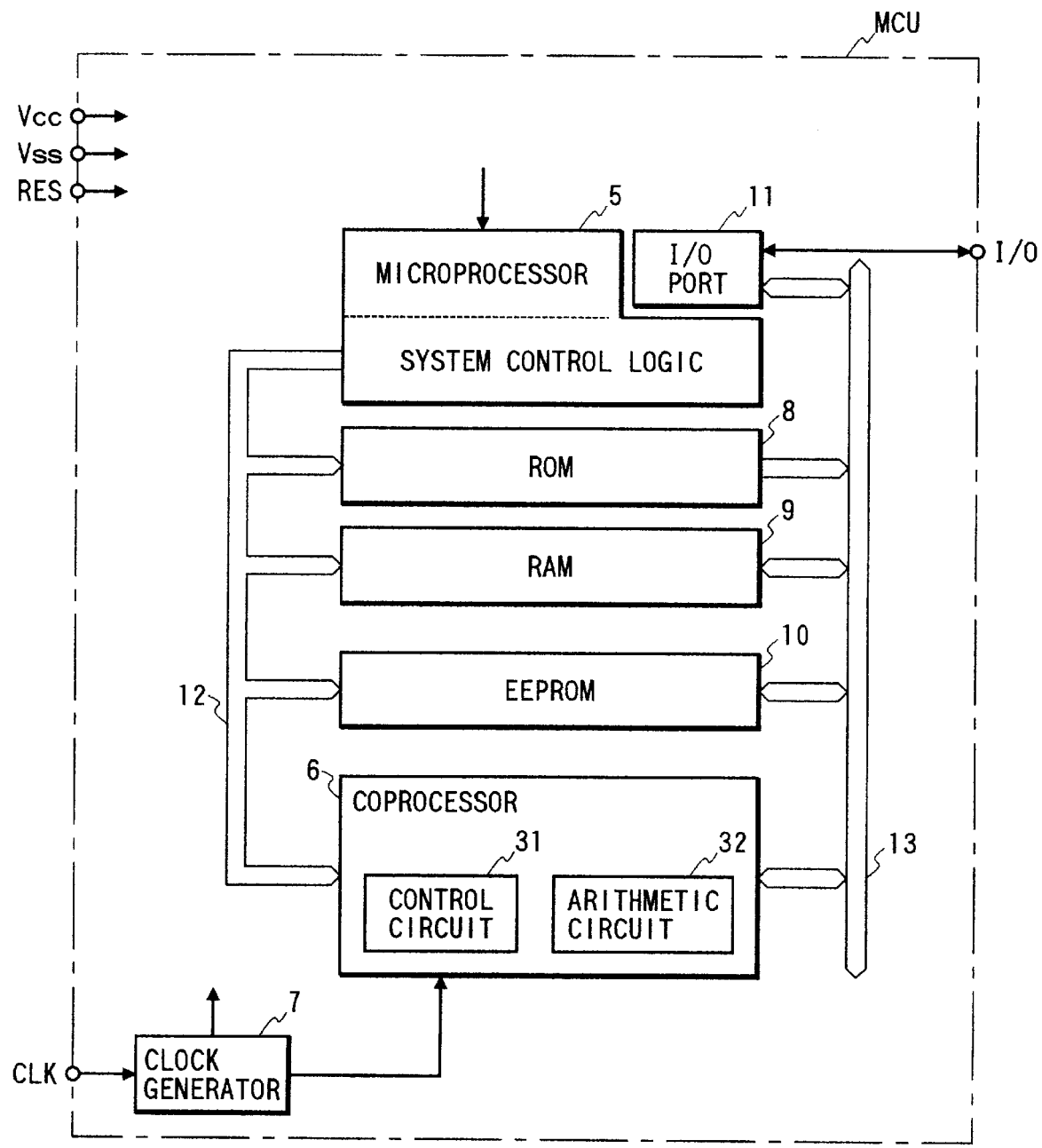
FIG. 3 is a block diagram showing an example of a microcomputer that can execute the algorithm 5 for a power-residue operation "$X^Y$ mod N"

FIG. 3 shows a block diagram of an example of a microcomputer MCU that can execute the [Algorithm 5] to perform the power-residue operation "$X^Y$ mod N".

In FIG. 3, reference numeral 5 is a microprocessor, 6 a coprocessor, 7 a clock generator, 8 a ROM (read-only memory) containing programs to be executed by the microprocessor 5 and fixed data, 9 a RAM (random access memory) that provides a work area for the microprocessor 5, 10 a non-volatile memory (simply referred to as an EEPROM), such as an electrically erasable programmable EEPROM and a flash memory used to store information coded by applying the power-residue operation "$X^Y$ mod N", and 11 an input/output port (I/O port). The microprocessor 5, coprocessor 6, ROM 8, RAM 9, EEPROM 10 and I/O port 11 are commonly connected to representatively shown buses 12, 13. The bus 12 generally represents an address bus and a control bus. Denoted by 13 is a data bus. The clock generator 7 generates an internal operation reference clock signals according to the clock signals supplied from the clock terminal CLK and feeds then to the microprocessor 5 and the coprocessor 6. The I/O port 11 is connected to a data input/output external terminal I/O. Vcc and Vss are power supply external terminals of the microcomputer MCU. RES is an external terminal for resetting the microcomputer MCU.

The microcomputer MCU comprises all the function blocks shown in FIG. 3 formed in a single semiconductor substrate, such as a single crystal silicon substrate, though not limited to it.

The coprocessor 6. is regarded as a dedicated hardware for executing the "residue multiplication" described in step 4, step 7, step 8 and step 10 of the [Algorithm 5], such as "$A = A \cdot B \cdot R^{-1}$ mod N+kN", and includes an arithmetic circuit 32 and a control circuit 31. The overflow correction circuit of FIG. 1 is included in the coprocessor 6. The input values A, B, R, N and output value A for the residue multiplication are held in registers in the coprocessor 6 or in a memory device such as a RAM. They may also be held in the RAM 9.

The microprocessor 5 is a known general-purpose microprocessor capable of executing calculation instructions and condition branch instructions, and realizes the power-residue operation "$X^Y$ mod N" through the [Algorithm 5] using the calculation function provided by the coprocessor 6.

Figure 4:
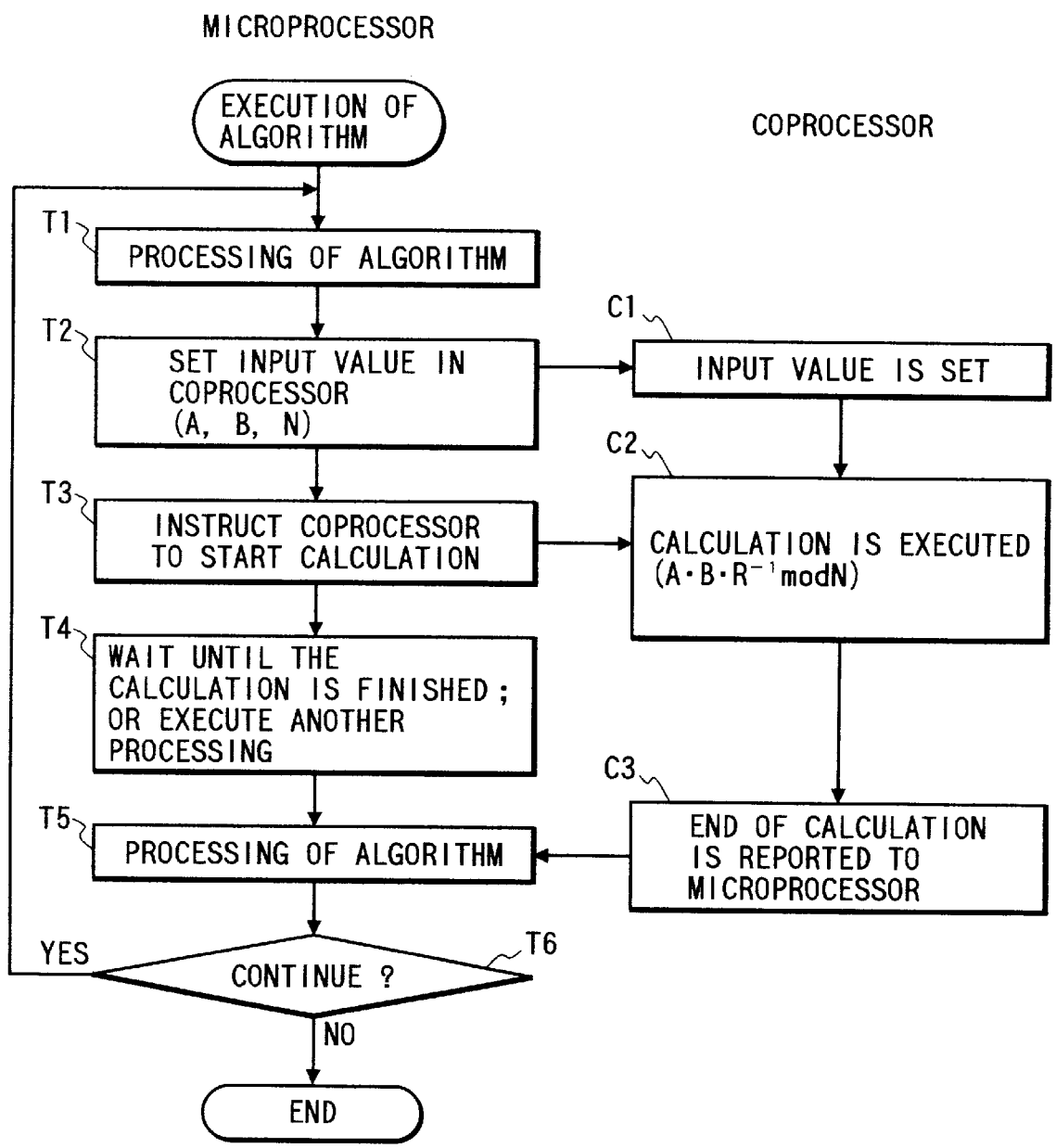
FIG. 4 is a flowchart showing the outline processing performed by the microprocessor and the coprocessor in the microcomputer of FIG. 3 when executing the power-residue operation "$X^Y$ mod N" according to the algorithm 5.

FIG. 4 is a flowchart schematically showing the sequence of processings performed by the microprocessor 5 and the coprocessor 6 when executing the power-residue operation "$X^Y$ mod N" by the [Algorithm 5]. In FIG. 4, T1 and T5 represent arithmetic processings that the microprocessor 5 must perform in the [Algorithm 5], and C2 represents an arithmetic processing that the coprocessor 6 must perform in the [Algorithm 5]. The arithmetic operation of C2 may, for example, be the processing carried out at step 4, 7, 8 and 10 in the [Algorithm 5]. The microprocessor 5, when it makes the coprocessor 6 perform a calculation, sets the values (A, B, N, etc.) required for the calculation in, for example, registers inside the coprocessor 6 (T2). Then, the microprocessor 5 instructs, through a command, the coprocessor 6 to start calculation (T3). The coprocessor 6 performs the calculation specified by the command, using the input values set at step C1 (C2). In the mean time, the microprocessor 5 waits until the calculation by the coprocessor 6 is finished, or can perform other processings (T4). When the coprocessor 6 finishes the calculation of C2, the coprocessor 6 informs the microprocessor 5 of the finish (C3). Using the result of calculation at step C2 done by the coprocessor 6, the microprocessor 5 executes the algorithm (T5). If there are any operations remaining that should be carried out by the coprocessor 6, the above process is repeated after the step T6 is executed.

(2) Second Embodiment

In the above [Algorithm 5], the residue multiplication "$A^2 \cdot R^{-1}$ mod N+kN" described at step 7 can be realized by setting B=A in the residue multiplication "$A \cdot B \cdot R^{-1}$ mod N+kN" of step 8. However, actually transferring the value of a register assigned to A to a register assigned to B increases the calculation time. When the step 8 is executed repetitively in the loop of "for" statement, the calculation can be performed more efficiently by not rewriting the value of B with the value of A at step 7 because the same value of B can be used repetitively. The residue multiplication "$A \cdot R^{-1}$ mod N+kN" shown at step 10, too, can be realized similarly by setting B=1. Setting B at 1, however, causes a problem of increased calculation time. These are the fifth problem mentioned earlier.

To solve this problem, the circuit for realizing the residue multiplication "$A \cdot B \cdot R^{-1}$ mod N+kN" adopts a configuration that allows selection of the value of A or "1" in place of the value of B.

Figure 5:
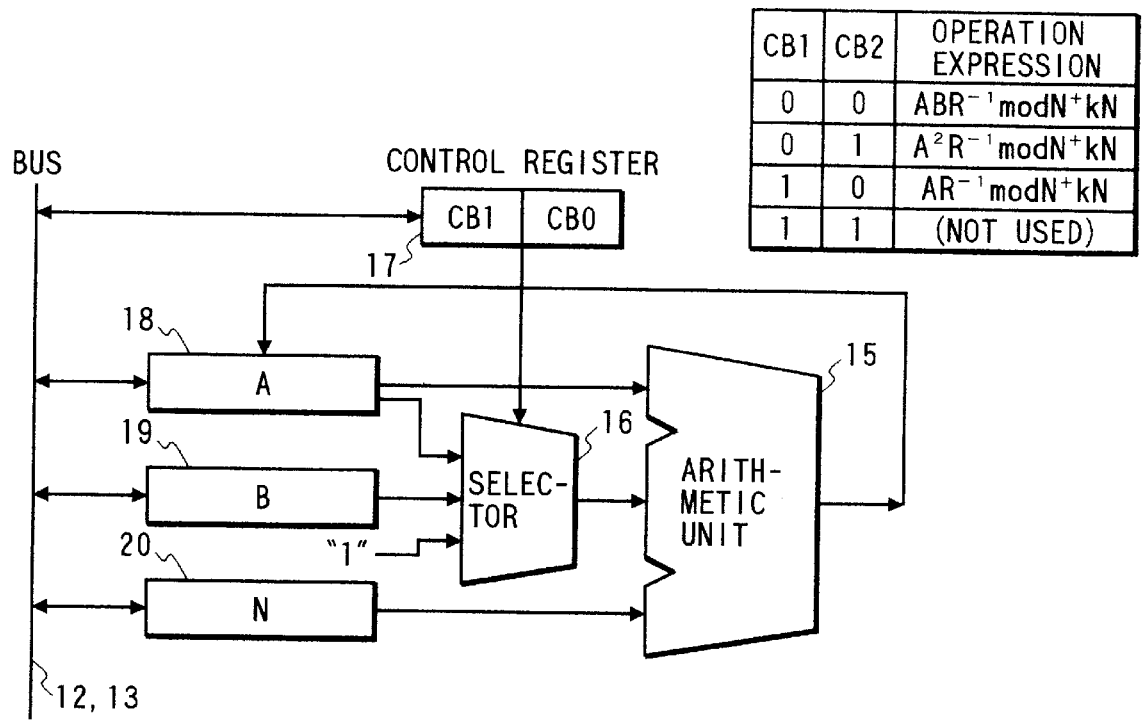
FIG. 5 is a block diagram showing a calculation means of the coprocessor that can selectively execute one of residue multiplications "$A \cdot B \cdot R^{-1}$ mod N+kN", "$A^2 \cdot R^{-1}$ mod N+kN" and "$A \cdot R^{-1}$ mod N+kN"

FIG. 5 shows a block diagram of a calculation means that solve the above problem. The calculation means shown in FIG. 5 is characterized as one circuit configuration realized by the coprocessor 6 of FIG. 3, and is included in the microcomputer MCU formed in a single semiconductor chip such as a single crystal silicon substrate.

In FIG. 5, designated by 15 is an arithmetic unit, 16 a selector, 17 a control register, and 18–20 registers for calculation. The selector 16 selects a register 18, 19 or a fixed value "1" according to the values of the control bits CB0, CB1 of the control register 17 and gives it to the arithmetic unit 15. The two bits CB0, CB1 of the control register 17 specify an operation expression according to the combination of their logic values. That is, according to its set value, the control register 17 feeds one of the value A of the register 18, the value B of the register 19 and the fixed value "1" through the selector 16 to the arithmetic unit 15 as the value of B in the residue multiplication "$A \cdot B \cdot R^{-1}$ mod N+kN". According to the selection of the selector 16 based on the bits CB0, CB1 of the control register 17, the arithmetic unit 15 can calculate "$A \cdot B \cdot R^{-1}$ mod N+kN", "$A^2 \cdot R^{-1}$ mod N+kN" and "$A \cdot R^{-1}$ mod N+kN" similarly. Hence, no processing is required to transfer the value A to the value-B holding register or set "1" in the value-B holding register.

The setting of a value in the control register 17 is performed, for example, by the microprocessor 5 of FIG. 3 via buses 12, 13.

Figure 6:
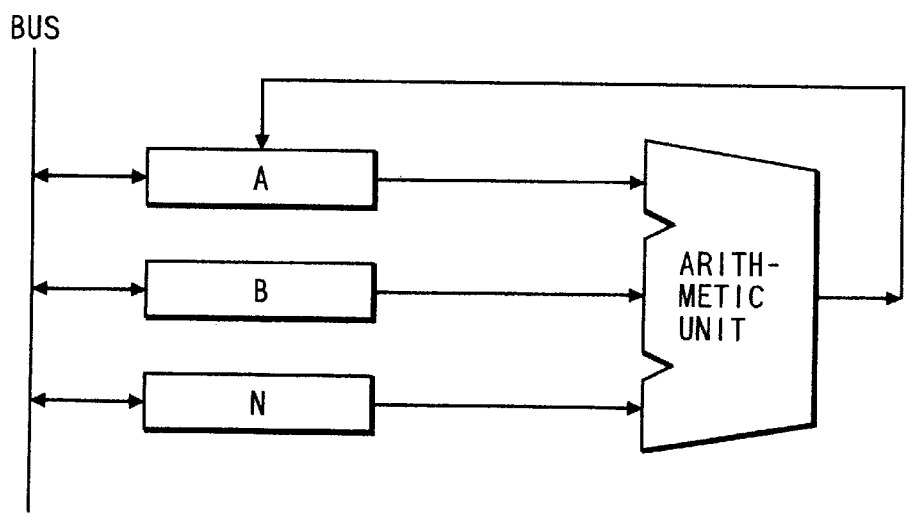
FIG. 6 is a block diagram showing a calculation means, for comparison with the one of FIG. 5.

FIG. 6 shows a block diagram of an example of calculation means for comparison with the one of FIG. 5. In executing the residue calculation "$A^2 \cdot R^{-1}$ mod N+kN", the calculation means of FIG. 6 needs to transfer the value A to B or set the value of B to "1" through buses.

(3) Third Embodiment

The above [Algorithm 5] requires the result ($A_{out}$) of the residue calculation "$A(A_{out})=A(A_{in}) \cdot B \cdot R^{-1}$ mod N+kN" to be stored in the same memory device or register that the input value $A(A_{in})$ is stored in. The calculation of a residue multiplication generally cannot be executed instantaneously and requires a number of clocks (calculation steps) for referencing the input values A, B and N a number of times. Hence, the interim results and the final result cannot be stored in the same memory device in which the input value A is held and therefore need to be stored as temporary values (Temp) in a separate temporary memory device. Thus, the operation expression "$A=A \cdot B \cdot R^{-1}$ mod N+kN" should be changed to "Temp←$A \cdot B \cdot R^{-1}$ mod N+kN". This means that to realize the step 8 requires executing "A←Temp" last, increasing the calculation time. This problem found by the inventor corresponds to the sixth problem mentioned earlier and also occurs in step 4, 7 and 10 of the [Algorithm 5].

Figure 7:
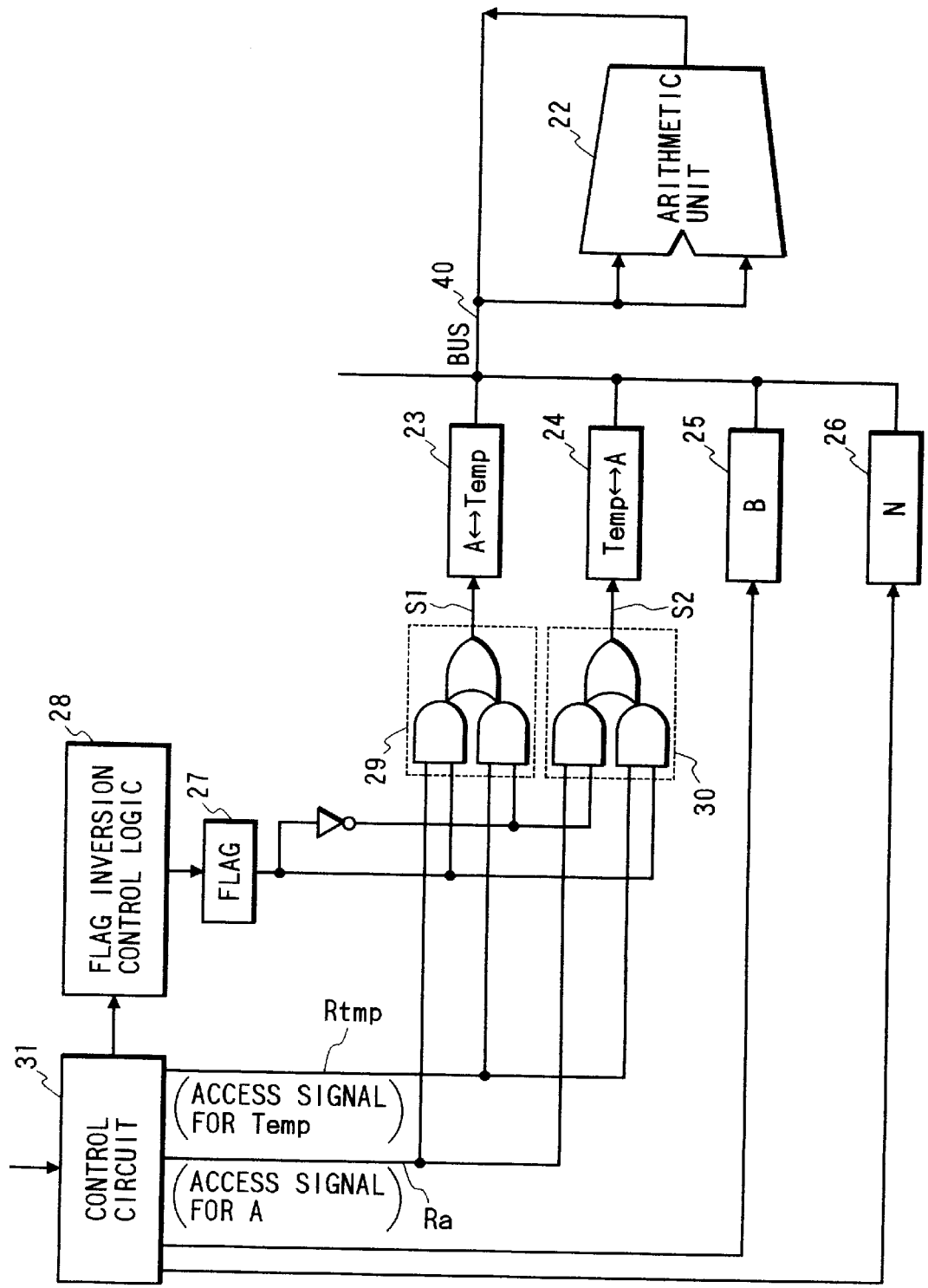
FIG. 7 is a block diagram showing an example of calculation means that realizes a register function exchange between an input register and a temporary register in calculations such as "$A=A \cdot B \cdot R^{-1}$ mod N+kN"

FIG. 7 shows a block diagram of a calculation means intended to solve the above problem. The calculation means of FIG. 7 may be characterized as one circuit configuration realized by the coprocessor 6 of FIG. 3 and included in the microcomputer MCU formed in a single semiconductor chip such as a single crystal silicon substrate.

In FIG. 7, denoted by 22 is an arithmetic unit; 23 and 24 registers that can be alternately used as a register for storing the value A and as a temporary register for holding a temporary value Temp; 25 a register for storing the value B; and 26 a register for storing the value N. The registers 23–26 and the arithmetic unit 22 are commonly connected to an internal bus 40 in the coprocessor.

In FIG. 7, S1 represents a selection signal for the register 23, and S2 represents a selection signal for the register 24. Rtmp is an access signal for a temporary storage value Temp and Ra is an access signal for the value A. The access signals Rtmp, Ra are a kind of calculation control signal output from the control circuit 31 according to the command that the microprocessor has given to the coprocessor.

Designated by 29 and 30 are selectors which select the access signal Ra or Rtmp according to the value of the flag 27 and outputs the selected signal as the register selection signal S1, S2. When the flag 27 is "1," the selector 29 selects the access signal Ra as the register selection signal S1 and the selector 30 selects the access signal Rtmp as the register selection signal S2. When the flag 27 is "0, the selection of the selectors 29, 30 are reversed.

The setting of the flag 27 is done by a flag inversion control logic 28. The flag inversion control logic 28 is included in, for example, the control circuit 31 and, when informed of the finish timing of the residue multiplication "$A \cdot B \cdot R^{-1}$ mod N" by the sequencer that controls the sequence of the calculation, inverts the state of the flag 27 in synchronism with that timing.

In this manner, the registers 23 and 24 are alternately assigned for holding the value A or the temporary value Temp each time the residue multiplication "$A \cdot B \cdot R^{-1}$ mod N" is performed. For example, when the register 23 is used for storing the value A, the register 24 is used for storing the temporary value Temp. At the end of the execution of the residue multiplication "A·B·R$^{-1}$ mod N", the control is performed to switch the correspondence of the selection signals S1, S2 for the access signals Ra, Rtmp. This exchange of the register functions is controlled by inverting the 1-bit flag 27 at the end of the execution of the residue multiplication "A·B·R$^{-1}$ mod N". This allows the value A and the value Temp to be switched apparently instantaneously, thus contributing to a reduction in the calculation time.

Figure 8:
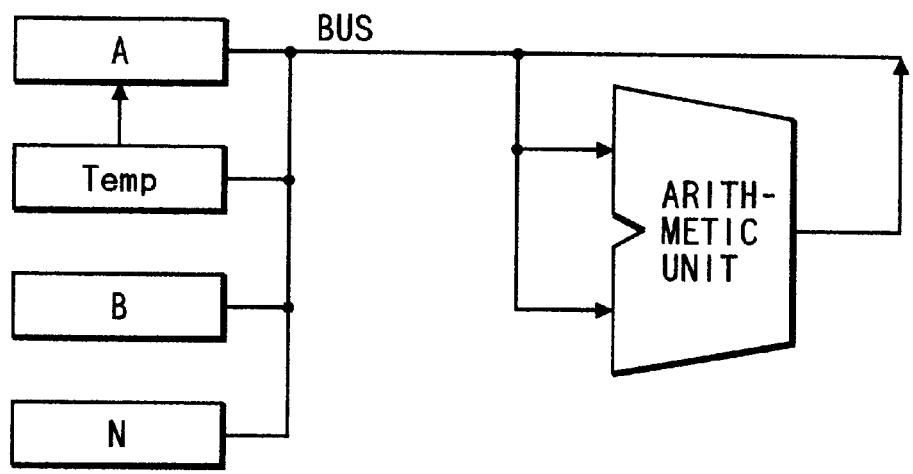
FIG. 8 is a block diagram showing an example of the calculation means, for comparison with the one of FIG. 7.

FIG. 8 shows an example of calculation means for comparison with the one of FIG. 7. In the calculation means of FIG. 8, the result of the residue multiplication "A·B·R$^{-1}$ mod N" is first held in the temporary register that is fixedly assigned for storing a temporary value Temp. The value Temp of the temporary register is then transferred to a register dedicated for storing the value A. The register for the value A holds the final result. Such a data transfer takes no little time.

Figure 9:
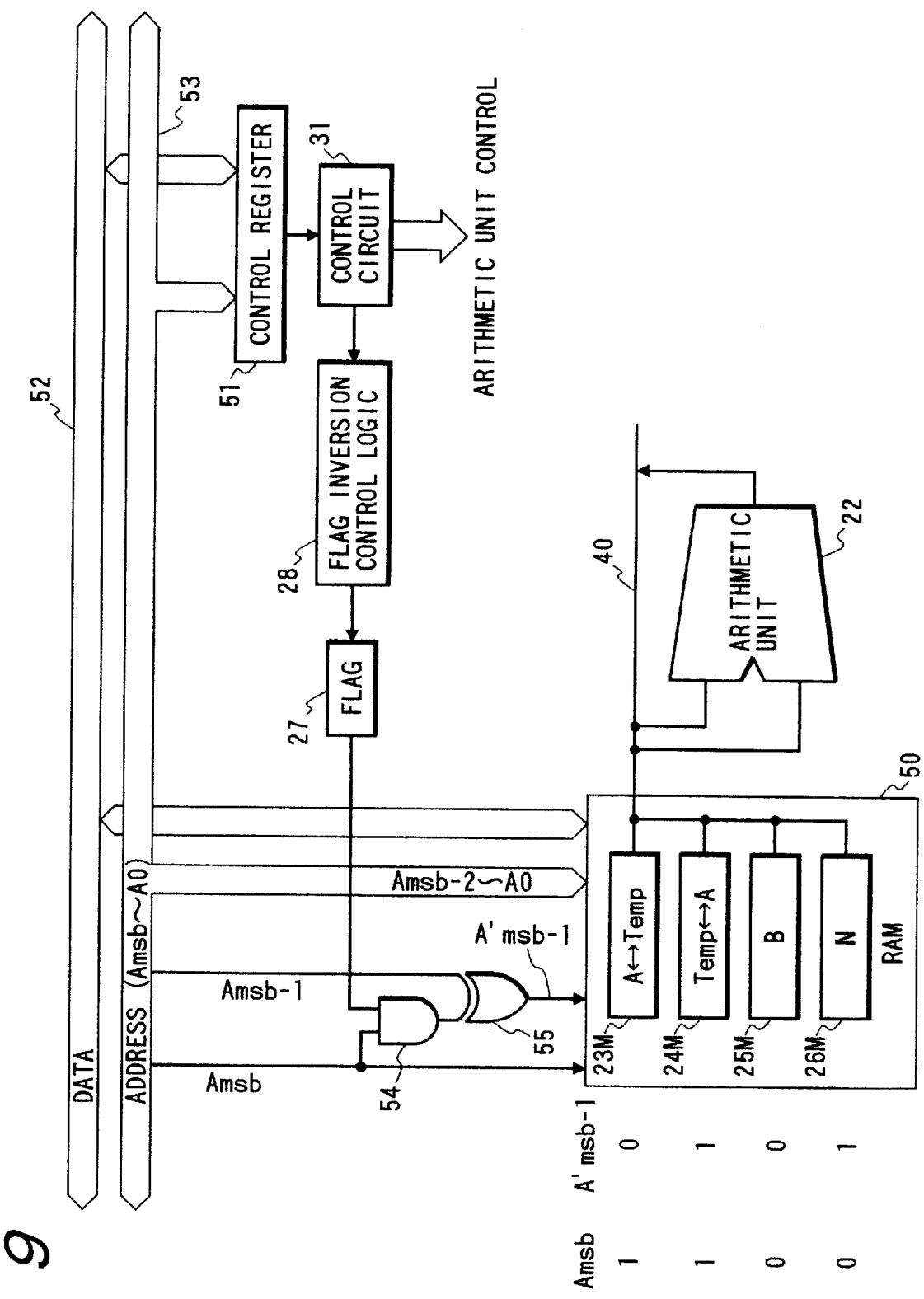
FIG. 9 is a block diagram showing an example of calculation means that realizes a register function exchange by replacing the register of FIG. 7 with a RAM.

FIG. 9 shows an example of a coprocessor when the registers 23–26 of FIG. 7 are realized by a RAM 32.

The coprocessor shown in FIG. 9 can be characterized as one circuit configuration applied to the coprocessor 6 of the microcomputer MCU of FIG. 3 though not to limited to it, and is included in the microcomputer MCU formed in a single semiconductor chip such as a single crystal silicon substrate.

In FIG. 9, numeral 50 denotes a RAM, and memory regions 23M–26M are representatively shown. The memory regions 23M and 24M are alternately used for storing the value A and for storing the temporary value Temp, the interim result of calculation. The memory region 25M is used to store the value B and the memory region 26M the value N. The memory regions 23M–26M are connected to a representatively shown arithmetic unit 22 through an internal bus 40 in the arithmetic circuit. The access to the RAM 50 is controlled through the buses 52, 53. The addressing of the RAM 50 is performed using address signals Amsb-A0 of a predetermined number of bits.

In a control register 51, a command supplied from the microprocessor is set, and the control circuit 31 decodes it to generate control signals for the arithmetic unit 22 and so forth.

The selection information for the memory regions 23M–26M is two bits Amsb, Amsb−1 on the most significant bit side of the address signal. In order to forcedly invert the logic value of Amsb−1 according to the logic value of the flag 27 when Amsb=1, an AND gate 54 and an Exclusive-OR gate 55 are provided so that the output A'msb-1 of the gate 55, in place of Amsb−1 , is fed to the RAM 50. When Amsb=1 and A'msb-1=0, the memory region 23M is selected; When Amsb=1and A'msb−1=1, the memory region 24M is selected; when Amsb=0 and A'msb−1=0, the memory region 25M is selected; when and Amsb=0 and A'msb−1=1, the memory region 26M is selected. On the program of the coprocessor, Amsb=1 and Amsb−1=0 means that the memory region for the value A is specified, and Amsb=1 and Amsb−1=1 means that the memory region for the value Temp is specified.

The setting of the flag 27 is performed by the flag inversion control logic 28. When informed of the finish timing of the residue multiplication "A·B·R$^{-1}$ mod N" by the sequencer in the control circuit 31 that controls the sequence of the calculation, the flag inversion control logic 28 inverts the state of the flag 27 in synchronism with that timing.

As a result, the memory regions 23M and 24M are used exclusively for storing the value A and the temporary value Temp, respectively. When, for example, the flag 27 is 0, the memory region 23M is used for storing the value A and the memory region 24 is used for storing the value Temp. When the flag 27 is inverted to 1 at the end of the execution of the residue multiplication, the memory region 23M is used to store the value Temp and the memory region 24M the value A. This allows the exchange between the value A and the content of Temp to be performed apparently instantaneously, also when the RAM 50 is used in stead of registers.

(4) Fourth Embodiment

The algorithm for executing the residue multiplication "A=A·B·R$^{-1}$ mod N+kN" represented at step 8 in the [Algorithm 5] is described in the [Algorithm 4]. In this algorithm, the following considerations are needed.

At step 1 and step 2 in the [algorithm 5] N' and M need to be prepared beforehand. In addition, the value M, which is large, needs to be held until the time of calculation. Further, at step 3 of the [Algorithm 5], because the interim result AB is a large number whose data length is the sum of the data lengths of A and B, a memory device for temporarily holding these interim results is required to have a correspondingly large capacity. This corresponds to the first problem mentioned previously.

At step 3 in the [Algorithm 5] it is necessary to execute multiplication of the large numbers A, B, M and N, so the problem is how to efficiently realize such multiplications. When this is realized with hardware, because frequent data transfers need to be performed between the memory devices holding the values of A, B, N and the arithmetic unit that performs multiplication, consideration must be taken to minimize the size of the logic circuits of the memory devices and data paths. This corresponds to the third problem mentioned earlier.

Here, as a means to solve these problems, let us first explain the principle of realizing the efficient multiplication of the large numbers A, B, M, N.

Figure 10:
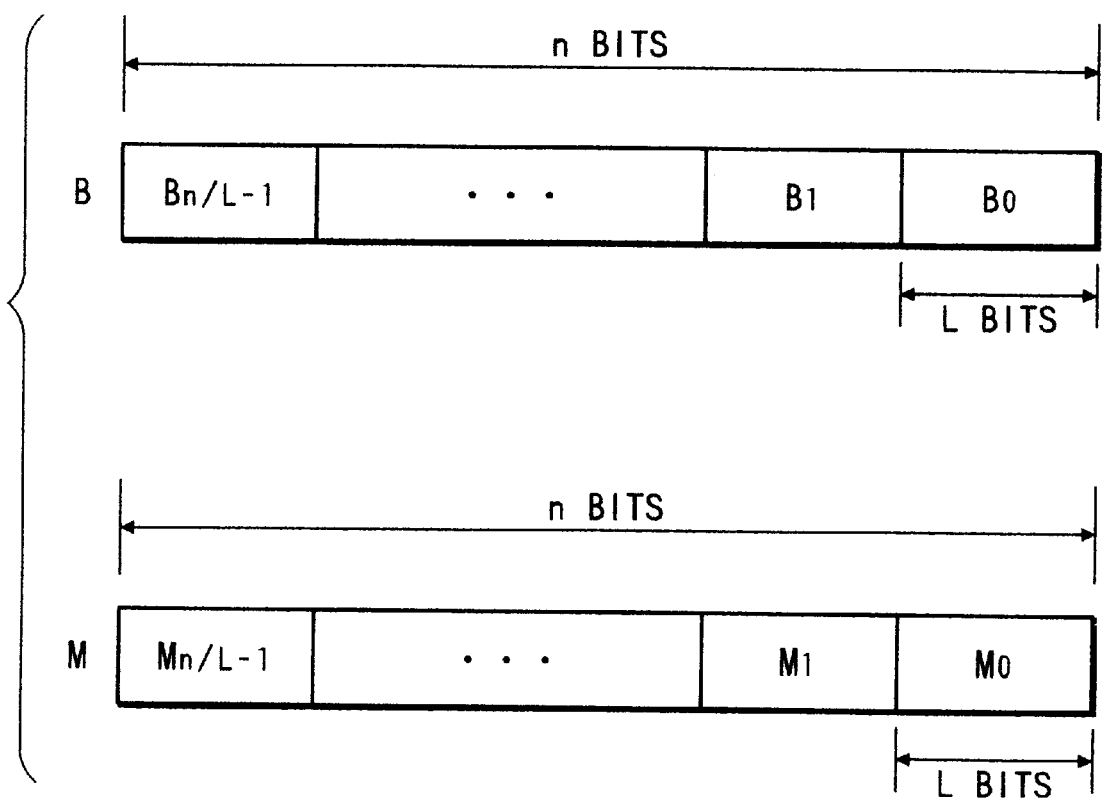
FIG. 10 is an explanatory diagram showing values B and M divided into blocks for partial products.

FIG. 10 shows an example of block divisions of the values B and M. In FIG. 10, n-bit values B and M are each divided into L-bit blocks, and consequently B and M are each divided into n/L blocks. For example, n is a value of 512 bits and L 32 bits.

Using this block division, the operation expression "(A·B+M·N)/R" described at step 3 of the [Algorithm 4] can be resolved into partial products as follows. The rewrite of the above operation expression is shown, omitting part of it to the extent that only the partial products is easily understood.

$$(A \cdot B + M \cdot N)/R = (A \cdot (2^{n-L} \cdot B_{n/L-1} + \ldots + 2^L \cdot B_1 + B_0) +$$
$$(2^{n-L} \cdot M_{n/L-1} + \ldots + 2^L \cdot M_1 + M_0) \cdot N)/R$$
$$= (\ldots((A \cdot B_0 + M_0 \cdot N)/2^L + (A \cdot B_1 + M_1 \cdot N))2^L +$$
$$\ldots + (A \cdot B_{n/L-1} + M_{n/L-1} \cdot N))/2^L$$

As can be seen from this rewritten expression, executing the operation "(A·B$_i$+M$_i$·N)/2$^L$" repetitively n/L times can result in "(A·B+M·N)/R".

Figure 11:
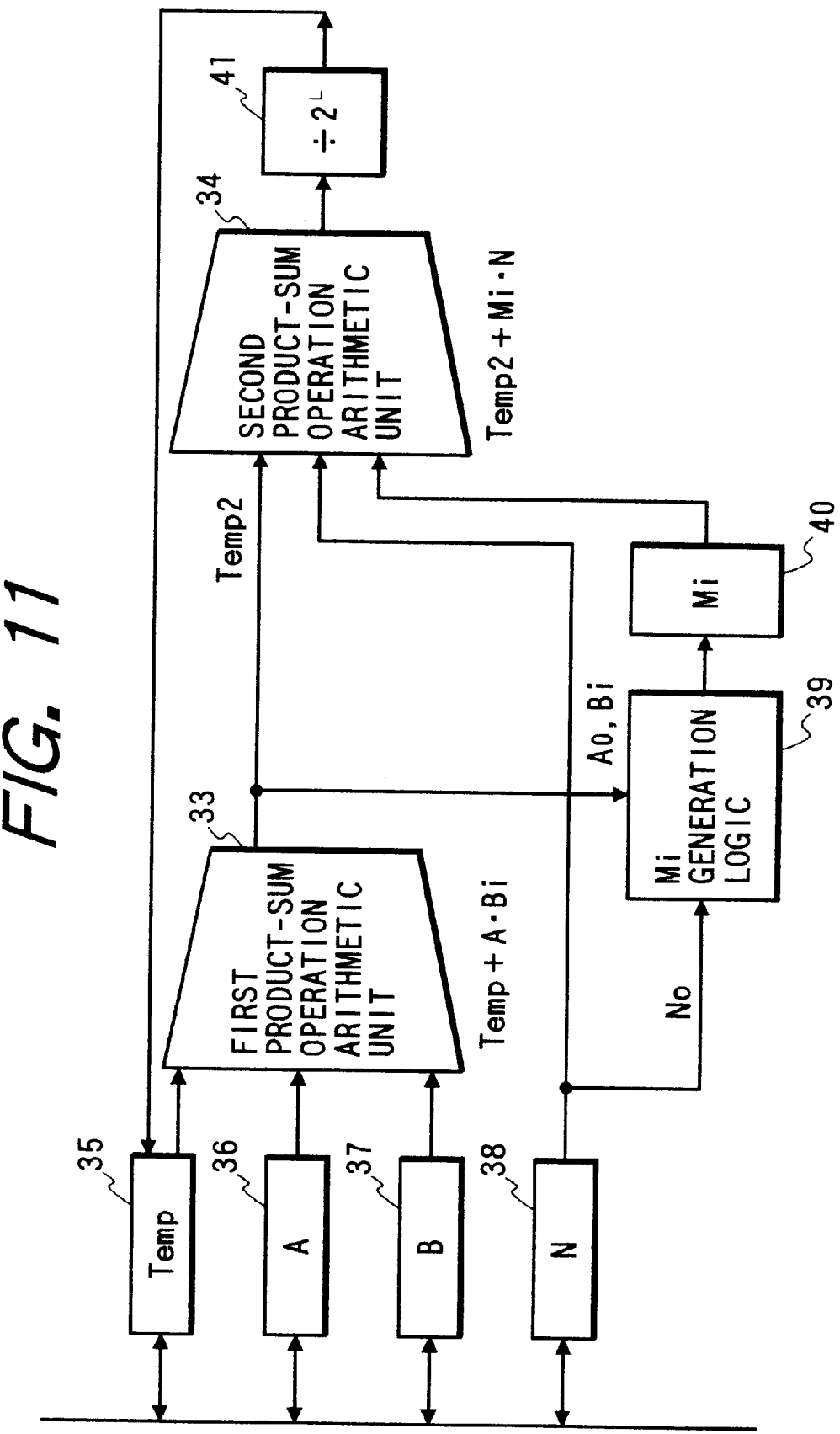
FIG. 11 is a block diagram of a coprocessor including a calculation means for executing an operation of the expression "$(A \cdot B_i + M_i \cdot N)/2^L$" through partial products.

FIG. 11 shows still another example of the coprocessor with emphasis placed on the calculation means for executing the operation "(A·B$_i$+M$_i$·N)/2$^L$" using the partial products. The coprocessor of FIG. 11 can be characterized as one circuit configuration applicable to the coprocessor 6 of FIG. 3 though not limited to it, and is included in the microcomputer MCU formed in a single semiconductor chip such as a single crystal silicon substrate.

In FIG. 11, numeral 33 denotes a first productsum operation arithmetic unit, 34 a second product-sum operation arithmetic unit, 35 a temporary register for holding a temporary value Temp, 36 a register for storing the value A, 37 a register for storing the value B, and 38 a register for storing the value N. Reference number 39 designates an $M_i$ generation logic, 40 a latch for holding the value $M_i$ generated by the $M_i$ generation logic 39, and 41 a shift circuit to perform "$\div 2^L$".

The circuit of FIG. 11 is intended to execute an operation "$(A \cdot B_i + M_i \cdot N)/2^L$" based on the block division shown in FIG. 10. The first produce-sum arithmetic unit 33 takes in as inputs the value Temp from the register 35, the value A from the register 36 and the value $B_i$ from the register 37 and executes the product-sum operation "Temp+$A \cdot B_i$". The result of calculation is sent as a value Temp2 to the second product-sum operation arithmetic unit 34 in the subsequent stage. The value Temp2 is an integer n+L bits long. The $M_i$ generation logic 39 takes in as inputs L-bit numbers $A_0$, $B_i$, $N_0$ to generate an L-bit integer $M_i$, which is temporarily held in the register 40. The second product-sum operation arithmetic unit 34 takes in as inputs the Temp2, N and Mi and executes the product-sum operation "Temp2+$M_i \cdot N$". The lower-order L bits of the (n+L)-bit calculation result are all zeros and are eliminated by the shifter 41 (i.e., by dividing it by $2^L$) before the n-bit result is sent as the value Temp to the register 35 where it is held.

The above operation is repeated n/L times to realize the operation "$(A \cdot B+M \cdot N)/R$". By this method there is no need to calculate and hold the n-bit integer M beforehand and what needs to be done is only to determine the L-bit $M_i$ during the calculation of the product-sum operation arithmetic unit 33 and store it in the register 40, thus eliminating the calculation time for the value M and reducing the size of the memory means for holding the value M. Further, by connecting the product-sum operation arithmetic unit 33 and the product-sum operation arithmetic unit 34 in series so that they can be operated successively, it becomes unnecessary to provide a special memory means for temporarily holding the (n+L)-bit interim result Temp2.

Figure 12:
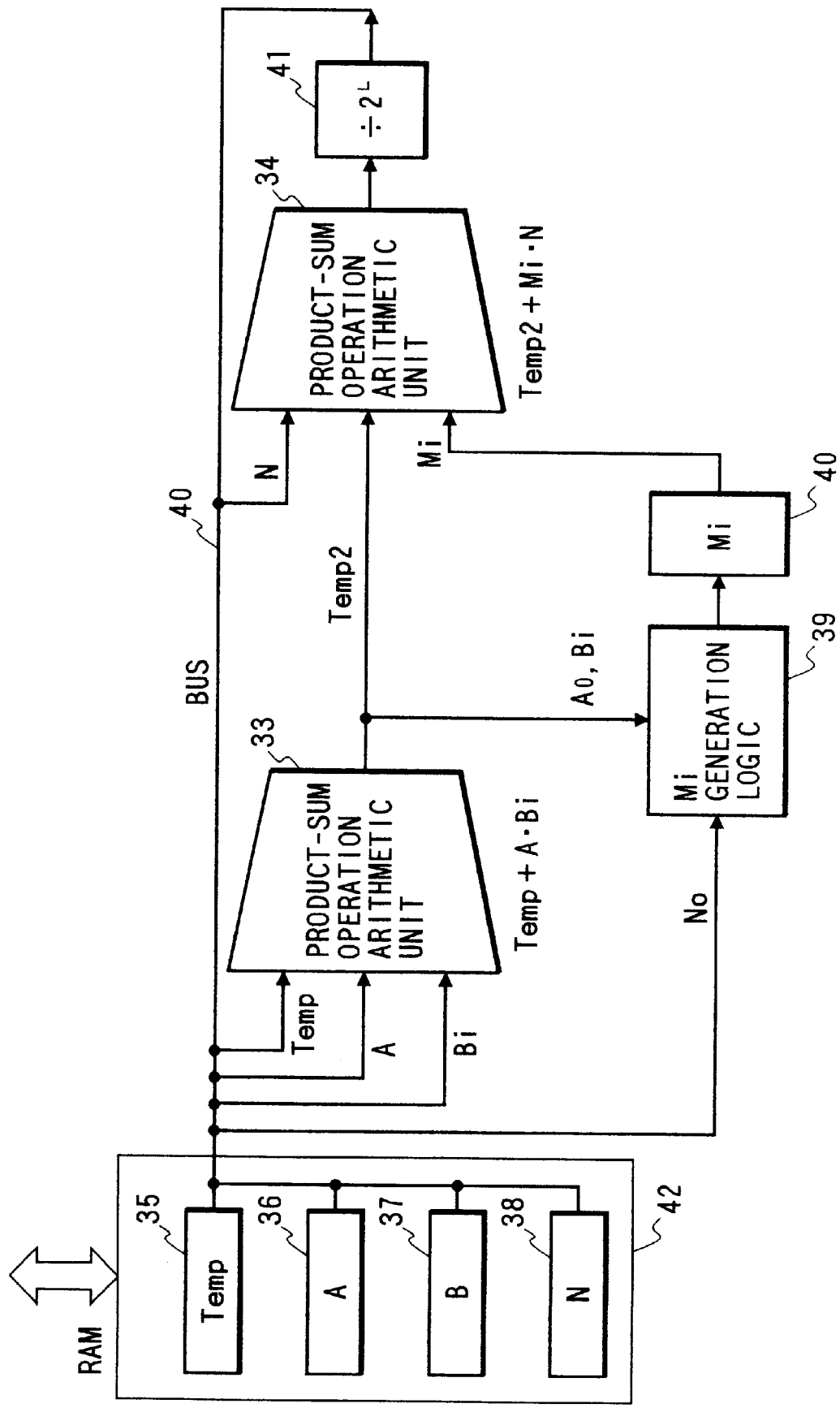
FIG. 12 is a block diagram of a coprocessor including another calculation means for executing an operation of the expression "$(A \cdot B_i + M_i \cdot N)/2^L$" through partial products.

FIG. 12 shows still another example of the coprocessor with emphasis placed on the arithmetic circuit for executing the operation "$(A \cdot B_i + M_i \cdot N)/2^L$", using the partial products. The coprocessor of FIG. 12 can be characterized as one circuit configuration applicable to the coprocessor 6 of FIG. 3, and, as in the previous example, is included in the microcomputer MCU formed in a single semiconductor chip such as a single crystal silicon substrate.

The example of FIG. 12 differs from the coprocessor of FIG. 11 in that the registers 35–38 are connected to the product-sum operation arithmetic units 33, 34 through the bus 40. This allows the registers 35–38 to be composed of a RAM 42, which in turn reduces the register area on the semiconductor chip. In this configuration, since the amount of data transferred on the bus 40 is especially large, the width of the bus 40 is correspondingly great, resulting in an increase in the area of the semiconductor chip. However this must be prevented. By connecting the two product-sum operation arithmetic units 33 and 34 in series as shown in FIG. 11, the need to transfer the interim result Temp2 through the bus is eliminated.

(5) Fifth Embodiment

In the coprocessor of FIG. 11 or FIG. 12, by not performing the operation "Temp=0" by the first product-sum operation arithmetic unit 33, the operation "$M_i \cdot N=0$" by the second product-sum operation arithmetic unit 34 or the operation "$\div 2^L$" by the selector 41, the calculation means shown can be used as a circuit to execute multiple-precision multiplications such as "$A \cdot B_i$" (multiplication between a small number $B_i$ and a large number A equivalent to multiple lengths). This is used as a means to solve the fourth problem mentioned above. The multiple-precision multiplication such as "$A \cdot B_i$" may be applied to the execution by microprocessor of, for example, the operation "$R^2$ mod N" at step 2 of the [Algorithm 5] to speed up the calculation.

Figure 13:
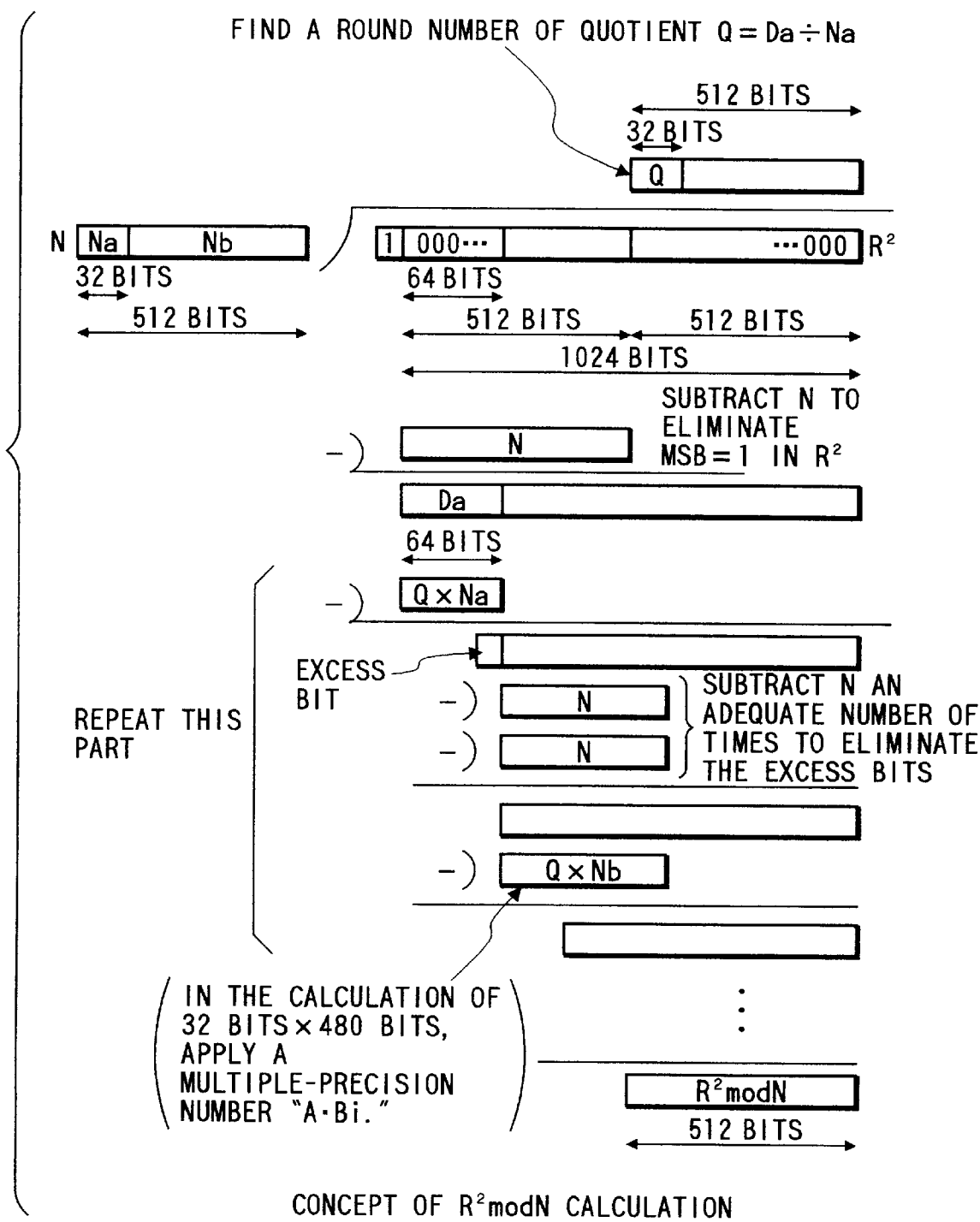
FIG. 13 is an explanatory diagram showing the concept of calculation "$R^2$ mod N"
Figure 14:
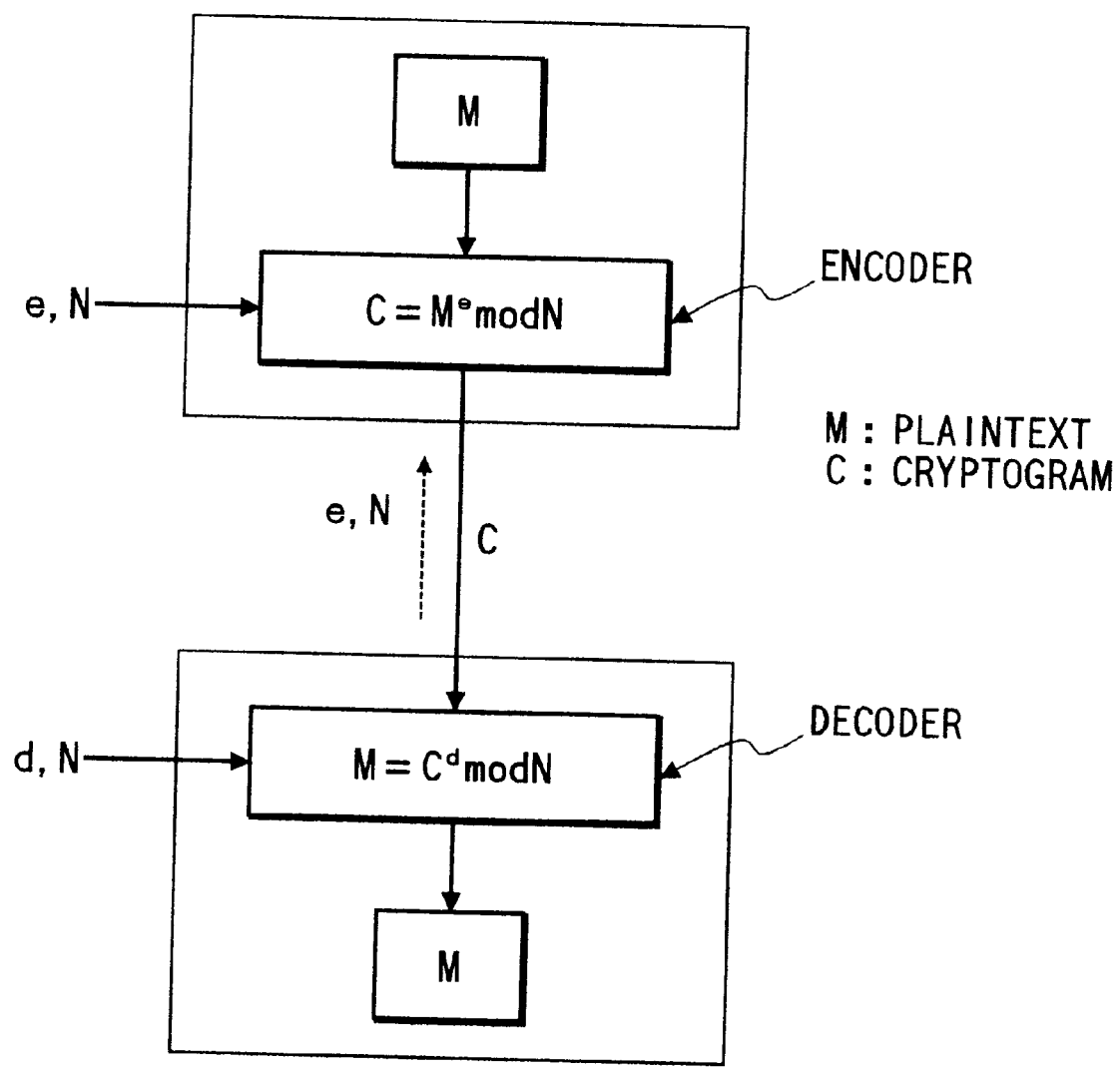
FIG. 14 is a schematic diagram showing an encoder/decoder where the power-residue operation is applied.

FIG. 13 shows the concept of the operation "$R^2$ mod N". In FIG. 13, $R=2^n$, n=512, N is 512 bits, and $R^2$ is a value whose most significant bit only is 1 and the other 1024 bits on the lower-order side are all 0. When the operation "$R^2$ mod N" is performed by the microprocessor, directly dividing a large number $R^2$ by a similarly large number N is not efficient. So, the dividend is considered as consisting of 64-bit blocks from the most significant bit side and the divisor is similarly taken as consisting of 32-bit blocks from the most significant bit side. The division of successive pairs of dividend and divisor blocks from the most significant bit side is performed to grasp the resulting values as a rounded number of quotient. In FIG. 13, for example, Q (=Da÷Na) is taken as a rounded number of quotient. Roughly speaking, this operation is done by subtracting "$Q \cdot Na$" from the higher-order side of $R^2$ and then subtracting "$Q \cdot Nb$" from the higher-order side of the previous subtraction result. The similar processing of the result of subtraction of "$Q \cdot Nb$" is performed and further the similar processing of the subtraction result is repeated, thereby obtaining the final result of "$R^2$ mod N". In practice, during this processing, subtraction for eliminating excess bits is introduced. In the example of FIG. 13, the first operation "$Q \cdot Nb$" is a multiplication of a 32-bit number and a 480-bit number. The multiplication processing of such large numbers is repeated a number of times. At this time, if multiple-precision multiplication, such as the previously described "$A \cdot B_i$" that can be calculated by the coprocessor of FIG. 11 or FIG. 12, is utilized, in other words, if such multiple-precision multiplication operation is left to the coprocessor, the calculation speed of the operation "$R^2$ mod N" at step 2 in the [Algorithm 5], when it is executed by using the microprocessor, can be increased.

The present invention accomplished by this inventor has been described in detail. It should be understood, however, that the invention is not limited to these embodiments but various modifications may be made without departing from the spirit of this invention. In the descriptions referring to FIGS. 1, 5, 7, 9, 11 and 12, although the above configurations have been explained assuming they are different coprocessor circuit configurations, all of these configurations or two or more selected ones can be realized in a single coprocessor.

The number of bits of the values A, B and N is not limited to 512 bits and a greater number of bits can of course be used. The hardware configurations to realize power-residue operations are not limited to the above embodiments but can be modified as needed.

The calculation technique described above can also be applied to data processors not shown, such as coprocessors and microcomputers, that perform powerresidue operations using the [Algorithm 1], not the [Algorithm 2].

One of the above embodiments have used a correction term kN. The processing using serially connected product-sum operation arithmetic units 33, 34 can also be applied to the following data processors that perform power-residue operations according the [Algorithm 3]. This data processor comprises a calculation means and a control means, both formed in a single semiconductor substrate, wherein the calculation means performs a residue operation defined by an operation expression "$A_{out}=f(A_{in})$ mod N" where the input value $A_{in}$ and output value $A_{out}$ are greater than N and smaller than $2^n$, n is a positive integer representing the number of bits of an operand, N is an n-bit positive integer in the range of $0<N<2^n$, $A_{in}$ is an n-bit positive integer in the range of $0 \leq A_{in} < 2^n$ and $A_{out}$ is an n-bit positive integer in the range of $0 \leq A_{out} < 2^n$, and the control means controls the residue operation performed by the calculation means. The residue operation defined by the operation expression "$A_{out} = f(A_{in})$ mod N" includes a residue operation given by an operation expression "$A_{out} = A_{in} \cdot B \cdot R^{-1}$ mod N" where R is $2^n$, $R^{-1}$ is an n-bit positive integer in the range of $0 < R^{-1} \leq N$ that satisfies "$R \cdot R^{-1}$ mod N=1", and B is an n-bit positive integer in the range of $0 \leq B < 2^n$. The calculation means has serially connected product-sum operation arithmetic units 33, 34 to execute a residue operation defined by an operation expression "$A_{out} = A_{in} \cdot B \cdot R^{-1}$ mod N". An example of residue calculation performed by this calculation means which is given by an operation expression "$A_{out} = A_{in} \cdot R^{-1}$ mod N" includes a calculation defined by "$t = (A_{in} \cdot B + M \cdot N)/R$" followed by the calculation of "if $t \geq R$ then return t−N else return t", with t−N or t taken as $A_{out}$. The calculation means executes the calculation "$t = (A_{in} \cdot B + M \cdot N)/R$" as the sum of partial products by the serially connected product-sum operation arithmetic units 33, 34. This scheme, too, does not require a temporary storage memory for the partial products and can reduce the size of the circuit of the calculation means.

In addition to coprocessors and microcomputers, this invention can also be applied widely to IC cards, encoders/decoders encryption/decryption devices that have coprocessors and microcomputers.

Representative advantages achieved by the present invention will be briefly summarized as follows.

First, a power-residue operation "$X^Y$ mod N" can be executed at high speed.

In the dedicated hardware for the power-residue operation, the size of the logic circuits can be reduced.

Further, the dedicated hardware can be formed in the same semiconductor chip in which the IC card microcomputer is formed, thus realizing an encrypting/decrypting microcomputer with low cost and ease of use to which a power-residue operation "$X^Y$ mod N" is applied.

A microcomputer incorporating a microprocessor, includes the coprocessor having product-sum operation arithmetic units executes residue multiplications given by "$A = A \cdot B \cdot R^{-1}$ mod N+kN", "$A = A^2 \cdot R^{-1}$ mod N+kN" and "$A = A \cdot R^{-1}$ mod N+kN", and has a multiplication function of executing a preprocessing "$R^2$ mod N" at high speed, so that it is possible to perform a power-residue operation "$X^Y$ mod N" at high speed by the microprocessor, using these calculation functions of the coprocessor.

What is claimed is:

1. A data processor formed in a single semiconductor substrate, comprising:

a calculation means to perform a residue operation defined by an operation expression "$A_{out} = f(A_{in})$ mod N+kN" where the input value $A_{in}$ and output value $A_{out}$ are integers equal to or greater than 0 and less than $2^n$, n is a positive integer representing the number of bits of an operand, N is an n-bit positive integer in the range of $0 < N < 2^n$, $A_{in}$ is an n-bit positive integer in the range of $0 \leq A_{in} < 2^n$, $A_{out}$ is an n-bit positive integer in the range of $0 \leq A_{out} < 2^n$, and k is 0 or a positive integer; and a control means to control the residue operation performed by the calculation means.

2. A data processor according to claim 1, wherein the residue operation defined by the operation expression "$A_{out} = f(A_{in})$ mod N+kN" includes residue operations given by operation expressions "$A_{out} = A_{in} \cdot B \cdot R^{-1}$ mod N+kN" and "$A_{out} = A_{in} \cdot B$ mod N+kN" where R is $2^n$, $R^{-1}$ is an n-bit positive integer in the range of $0 < R^{-1} \leq N$ that satisfies "$R \cdot R^{-1}$ mod N=1", and B is an n-bit positive integer in the range of $0 \leq B < 2^n$.

3. A data processor according to claim 2, wherein the residue operation given by the operation expression "$A_{out} = A_{in} \cdot B \cdot R^{-1}$ mod N+kN" includes a calculation given by "$t = (A_{in} \cdot B + M \cdot N)/R$" and a calculation following the first calculation and given by "if $t \geq R$ then return t−N else return t" where t−N or t is taken as $A_{out}$ and the calculation means detects $t \geq R$ based on the overflow of n bits of t.

4. A data processor according to claim 2, wherein the calculation means has a plurality of serially connected product-sum arithmetic units for executing a residue operation given by the operation expression "$A_{out} = A_{in} \cdot B \cdot R^{-1}$ mod N+kN".

5. A data processor according to claim 4, wherein the calculation means has a means to selectively specify the value of B in the operation expression "$A_{out} = A_{in} \cdot B \cdot R^{-1}$ mod N+kN" to be either $A_{in}$ or 1.

6. A data processor according to claim 2, wherein the residue operation given by the operation expression "$A_{out} = A_{in} \cdot B \cdot R^{-1}$ mod N+kN" includes a calculation given by "$t = (A_{in} \cdot B + M \cdot N)/R$" and a calculation following the first calculation and given by "if $t \geq R$ then return t−N else return t" where t−N or t is taken as $A_{out}$, and the calculation means has a plurality of serially connected product-sum operation arithmetic units to execute the calculation "$t = (A_{in} \cdot B + M \cdot N)/R$" as the sum of partial products.

7. A data processor according to claim 6, wherein the control means uses the serially connected product-sum operation arithmetic units to selectively execute a multiple-precision multiplication whose multiplier and multiplicand have multiple lengths.

8. A data processor according to claim 2, wherein the residue operation given by the operation expression "$A_{out} = A_{in} \cdot B \cdot R^{-1}$ mod N+kN" includes a calculation given by "$t = (A_{in} \cdot B + M \cdot N)/R$" and a calculation following the first calculation and given by "if $t \geq R$ then return t−N else return t" where t−N or t is taken as $A_{out}$ and the calculation means detects $t \geq R$ based on the overflow of n bits of t, has a plurality of serially connected product-sum operation arithmetic units to execute the calculation "$t = (A_{in} \cdot B + M \cdot N)/R$" as the sum of partial products and has a means to selectively specify the value of B in the operation expression "$A_{out} = A_{in} \cdot B \cdot R^{-1}$ mod N+kN" to be either $A_{in}$ or 1.

9. A data processor according to claim 8, wherein the control means uses the serially connected product-sum operation arithmetic units to selectively execute a multiple-precision multiplication whose multiplier and multiplicand have multiple lengths.

10. A microcomputer comprising a data processor of claim 9 and a microprocessor using this data processor as a coprocessor, both formed in a single semiconductor substrate, wherein the microprocessor sets in the data processor input values required for the calculation "$A_{out} = A_{in} \cdot B \cdot R^{-1}$ mod N+kN", instructs the data processor to perform the calculation, and uses the result of the calculation.

11. A microcomputer according to claim 10, further comprising a ROM containing a program that causes the microprocessor to perform power-residue operations including the "$A_{out} = A_{in} \cdot B \cdot R^{-1}$ mod N+kN".

12. A microcomputer according to claim 11, further comprising a nonvolatile memory to store electrically programmably data to be subjected to the power-residue operations.

13. A data processor comprising a calculation means and a control means, both formed in a single semiconductor substrate; wherein the calculation means performs a residue operation defined by an operation expression "$A_{out}=f(A_{in})$ mod N+kN" where the input value $A_{in}$ and output value $A_{out}$ are greater than N and less than $2^n$, n is a positive integer representing the number of bits of an operand, N is an n-bit positive integer in the range of $0<N<2^n$, $A_{in}$ is an n-bit positive integer in the range of $0 \leq A_{in}<2^n$, $A_{out}$ is an n-bit positive integer in the range of $0 \leq A_{out}<2^n$ and k is 0 or a positive integer; the control means controls the residue operation performed by the calculation means; the residue operation defined by "$A_{out}=f(A_{in})$ mod N+kN" includes a residue operation given by an operation expression "$A_{out}=A_{in} \cdot B \cdot R^{-1}$ mod N+kN" where R is $2^n$, $R^{-1}$ is an n-bit positive integer in the range of $0<R^{-1} \leq N$ that satisfies "$R \cdot R^{-1}$ mod N=1", and B is an n-bit positive integer in the range of $0 \leq B<2^n$; and the calculation means has a plurality of serially connected product-sum operation arithmetic units to execute the residue operation given by "$A_{out}=A_{in} \cdot B \cdot R^{-1}$ mod N+kN".

14. A data processor according to claim 13, wherein the residue operation given by the operation expression "$A_{out}=A_{in} \cdot B \cdot R^{-1}$ mod N+kN" includes a calculation given by "$t=(A_{in} \cdot B+M \cdot N)/R$" and a calculation following the first calculation and given by "if $t \geq R$ then return t−N else return t" where t−N or t is taken as $A_{out}$, and the calculation means has a plurality of serially connected product-sum operation arithmetic units to execute the calculation "$t=(A_{in} \cdot B+M \cdot N)/R$" as the sum of partial products.

15. A data processor formed in a single semiconductor substrate, comprising:

a calculation means to perform a residue operation defined by an operation expression "$A_{out}=f(A_{in})$ mod N+kN" where the input value $A_{in}$ and output value $A_{out}$ are integers equal to or greater than 0 and less than $2^n$, n is a positive integer representing the number of bits of an operand, N is an n-bit positive integer in the range of $0<N<2^n$, $A_{in}$ is an n-bit positive integer in the range of $0 \leq A_{in}<2^n$, $A_{out}$ is an n-bit positive integer in the range of $0 \leq A_{out}<2^n$, and k is 0 or a positive integer; and a control means to control the residue operation performed by the calculation means;

wherein the residue operation given by the operation expression "$A_{out}=A_{in} \cdot B \cdot R^{-1}$ mod N+kN" includes a calculation given by "$t=(A_{in} \cdot B+M \cdot N)/R$" and a calculation following the first calculation and given by "if $t \geq R$ then return t−N else return t" where t−N or t is taken as $A_{out}$, and the calculation means detects $T \geq R$ based on the overflow of n bits of t.

\* \* \* \* \*